(12) United States Patent
Niklas et al.

(10) Patent No.: US 6,632,361 B2
(45) Date of Patent: Oct. 14, 2003

(54) SHAPED OBJECTS FOR PYROGEN RETENTION AND PROCESSES FOR THEIR MANUFACTURE

(75) Inventors: Thorsten Niklas, Grosswallstadt (DE); Friedbert Wechs, Wörth (DE); Annekatrin Nothdurft, Elsenfeld (DE)

(73) Assignee: Membrana GmbH, Wuppertal (DE)

( * ) Notice: Subject to any disclaimer, the term of this patent is extended or adjusted under 35 U.S.C. 154(b) by 54 days.

(21) Appl. No.: 09/742,219

(22) Filed: Dec. 22, 2000

(65) Prior Publication Data

US 2001/0006160 A1 Jul. 5, 2001

(30) Foreign Application Priority Data

Dec. 23, 1999 (DE) .......................... 199 62 275

(51) Int. Cl.⁷ .......................... B01D 39/00; B01D 39/14
(52) U.S. Cl. .......................... 210/500.27; 210/500.42; 521/64; 521/149
(58) Field of Search .............. 521/64, 149; 210/500.42, 210/500.27

(56) References Cited

U.S. PATENT DOCUMENTS

| 4,976,859 A | 12/1990 | Wechs |
| 5,462,667 A | 10/1995 | Wollinsky et al. |
| 5,919,370 A | 7/1999 | Röttger et al. |

FOREIGN PATENT DOCUMENTS

| EP | B 0 361 085 | 4/1990 |
| EP | A 0 478 842 | 4/1992 |
| WO | WO 94/17906 | 8/1994 |
| WO | WO 98/01208 | 1/1998 |

OTHER PUBLICATIONS

Pschyrembel, "Klinisches Wörterbuch" (Clinical Dictionary), 257th Edition, de Gruyter (1994), p. 1279.

Primary Examiner—Morton Foelak
(74) Attorney, Agent, or Firm—Oliff & Berridge, PLC

(57) ABSTRACT

The invention describes hydrophilically acting shaped objects, in particular semipermeable membranes for pyrogen retention, comprising a synthetic polymer component and an additive made from a copolymer made from vinylpyrrolidone and a vinylimidazole compound, and furthermore processes for manufacturing the shaped objects. The shaped objects of the invention exhibit such a high pyrogen retention capacity that the pyrogen concentrations present in the filtrates are in part below the detection limit of the gel clot LAL test.

15 Claims, No Drawings

SHAPED OBJECTS FOR PYROGEN RETENTION AND PROCESSES FOR THEIR MANUFACTURE

BACKGROUND OF THE INVENTION

1. Field of the Invention

This invention relates to shaped objects for pyrogen retention, processes for their manufacture, and use thereof.

2. Description of Related Art

It is well known that pyrogens are substances, such as lipopolysaccharide complexes, that in extremely small amounts (approximately 0.2 $\mu$g/kg body weight) cause fever in higher-order animals and humans after intravenous injection (Pschyrembel, "Klinisches Wörterbuch" (Clinical Dictionary), 257th Ed., de Gruyter (1994), p. 1279). For this reason, infusion media contaminated with pyrogens, for example, must be rendered pyrogen-free prior to use.

A further area of application in which the removal of pyrogens is important is kidney dialysis using so-called high-flux membranes. Here, the dialyzate must either be freed of pyrogens, using a separate membrane unit for example, to prevent pyrogens from being filtered back through the wall of the dialysis membrane and thus entering the blood of the dialysis patient, or it is also possible to use a dialysis membrane that itself does not pass pyrogens, thus also preventing the transition of pyrogens into the blood. In this case, the pyrogen retention may be effected by the membrane's separation characteristic, i.e., the pyrogens are retained due to their size. In many cases, the pyrogen retention is based on adsorptive effects.

EP-A 0 478 842 describes a membrane filter layer made from inert polymer materials such as polyethylene, polypropylene, nylon 6,6, polycaprolactam, polyester, or polyvinylidene fluoride, from which membranes with a pore size of 0.04 to 0.45 $\mu$m can be produced for pyrogen removal, whereby the polymer material for the membrane filter layer is preferably a cationically or anionically modified polymer since the deposition capacity can be attained more readily. One example of a cationically modified polymer is nylon 6,6, whose surface is modified with a thermally hardenable polymer having quaternary ammonium groups. For the anionically modified polymers, carboxyl groups are preferred as the source of negative charge.

It is well known that pyrogens include the endotoxins, which represent cell fragments of dead gram-negative bacteria. With respect to endotoxin removal, WO 94/17906 describes a hydrophilic, charge-modified, microporous membrane having a cross-linked structure comprising an interpenetrating polymer network, whereby the membrane comprises polyethersulfone, polyfunctional glycidyl ether, polymeric amine, and possibly a homopolymer made from vinylpyrrolidone or a quaternized copolymer made from vinylpyrrolidone and dimethylaminoethyl methacrylate quaternized with methyl sulfate.

WO 98/01208 describes cationically charged membranes suitable for removing endotoxins. According to this publication, the membranes are manufactured by bringing a hydrophobic polymer membrane, preferably made from polysulfone, polyarylsulfone, or polyethersulfone, into contact with a polymer wetting agent and thereby cross-linking at least one agent cationically modifying the membrane onto the membrane. In another embodiment of WO 98/01208, the membrane is cast from a solution comprising polyethersulfone, a copolymer of vinylpyrrolidone and a cationic imidazolinium compound, preferably methylvinylimidazolinium methyl sulfate, and a low-molecular organic acid, whereby weight percentages for the acid in the casting solution of 24 to 34% by weight are disclosed. For this reason, the system components coming into contact with the casting solution must be acid-resistant, thus making the system more expensive.

The prior art discloses charge-bearing structures for pyrogen or endotoxin removal. Charge-bearing structures are preferred at least in order to attain a retention effect beyond that of the sieve effect. It is often noted, however, that the action of membranes modified in this manner is not sufficient, i.e., the endotoxin retention attained thereby is not high enough. Therefore, a need still exists for a product with improved retention of pyrogens or endotoxins, and for a process for manufacturing such a product.

SUMMARY OF THE INVENTION

The present invention is directed to a hydrophilically acting shaped object for pyrogen retention comprising a synthetic polymer component and a copolymer additive made from vinylpyrrolidone and a vinylimidazole compound, and a method of making the same.

DETAILED DESCRIPTION OF PREFERRED EMBODIMENTS

Surprisingly, it has been found that, due to the additive of the invention, the shaped object of the invention has an improved endotoxin retention capacity that is higher than that of a comparable charge-modified shaped object.

It is clear that the additive should be accessible to the pyrogens, i.e., present on the surface of the shaped object. Preferably, the additive is therefore either worked into the shaped object homogeneously, or, more preferably, present on the surface of the shaped object in increased concentration.

The shaped object of the invention may be pore-free. In this embodiment, the invention may be, for example, in the form of a correspondingly fine-grained powder used as an adsorption medium for pyrogen retention columns.

Preferably, however, the shaped object of the invention has a porous structure, and it is especially preferred for it to have a porous structure open toward the surface and thus to have a pore surface in addition to the geometrical surface. Such objects have a large surface area comprising the external geometric surface and the inner surface of the pores, whereby the additive is accessible both on the geometric and pore surfaces. Due to its pore size, the shaped object of the invention allows at least part of the pyrogens to pass. The additive of the invention, present on the pore surface, acts to retain these pyrogens.

It is especially preferred for the porous shaped object to be a semipermeable flat, tubular, or hollow-fiber membrane, whereby one skilled in the art will understand how large the dimension of the pores should be in order to maintain the pressure build-up within acceptable limits, yet understand how small the pores should be to maintain sufficient pore surface and thus sufficient load capacity of the membrane for the pyrogens or endotoxins.

The copolymer of the invention may have any known copolymer structure, such as, for example, a block copolymer. Preferably, the copolymer is a statistic copolymer.

In accordance with the invention, the molar ratio of the vinylimidazole compound to the vinylpyrrolidone in the copolymer may be selected from a broad range. Preferably, the ratio is from 10:90 to 90:10 mol/mol. A ratio of about 50:50 mol/mol is especially preferred.

In accordance with the invention, the vinylimidazole compound may be substituted at one or more of carbon atoms 2, 4, and 5, whereby the vinylimidazole compound is preferably 1-vinylimidazole substituted at carbon atoms 2 and/or 4 and/or 5 with a $C_1$–$C_5$-alkyl group. In another preferred embodiment of the invention, the vinylimidazole compound is 1-vinylimidazole.

For many of the applications of the shaped object of the present invention, the adsorptive adhesion of the additive on the synthetic polymer component is sufficient, such that no after-treatment is required to increase the additive adhesion. For other applications of the shaped object of the invention, in which, without after-treatment, a portion of the additive may be eluted (for example by sterilization, extraction, or another after-treatment step of the shaped object such as pre-flushing of the membrane, or by the pyrogen-contaminated liquids used) the shaped object of the invention may contain the additive in a form that sufficiently increases adhesion. Preferably, the additive is cross-linked to increase adhesion.

Since the pyrogen- or endotoxin-containing solutions are generally aqueous, the synthetic polymer component must act hydrophilically, no later than when the shaped object is used according to the invention. To this end, basically any structure is suitable that renders the geometric surface, and the porous surface in the case of a porous shaped object, hydrophilic. For example, the hydrophilic action may be attained by treating the shaped object under pressure with known wetting agents such as ethanol, isopropyl alcohol, or a mixture of ethanol and/or isopropyl alcohol with water, or with water alone.

In the scope of the present invention, however, the following embodiments are preferred, which render the shaped object permanently hydrophilic. In one of these preferred embodiments, the synthetic polymer component is a hydrophilic polymer, whereby the polymer may also be one that was originally hydrophobic and was chemically hydrophilized by, for example, amidation, amination, carboxylation, sulfonation, or hydroxylation. Especially preferred hydrophilic polymers are polyamide 6, polyamide 6,6, polyamide 4,6, polyethylvinyl alcohol, or sulfonated polyethersulfone.

In another preferred embodiments, the synthetic polymer component comprises a mixture of a hydrophobic polymer with a hydrophilic modification of this polymer. In another preferred embodiment of the invention, the synthetic polymer component is a hydrophobic first polymer and a hydrophilic second polymer. In an especially preferred embodiment of the invention, the hydrophobic first polymer is selected from the group comprising polysulfones, polyethersulfones, polyarylethersulfones, polyacrylonitriles, polycarbonates, or polyolefins such as polyethylene or polypropylene. In another especially preferred embodiment of the invention, the hydrophilic second polymer is selected from the group comprising polyvinylpyrrolidones, polyethylene glycols, polyvinyl alcohols, or sulfonated polyethersulfones.

The invention further comprises a first process for manufacturing a hydrophilically acting shaped object for pyrogen adsorption, comprising an additive and a synthetic polymer component, by preparing a solution comprising a synthetic polymer component, shaping the solution, subjecting the solution to phase separation that is thermally induced or induced by a non-solvent, resulting in the shaped object, washing, subsequent drying of the shaped object, and possibly treating with a wetting agent. In this embodiment, a copolymer made from vinylpyrrolidone and a vinylimidazole compound is selected as the additive and the additive is added either to the solution comprising the synthetic polymer component, or the additive is added in a manufacturing step for the shaped object following the shaping of the solution.

The shaped object of the invention may be manufactured pore-free and in this embodiment is suitable, in the form of a correspondingly fine-grained powder for example, for use as an adsorption medium for pyrogen retention columns.

In a preferred embodiment, hydrophilically acting shaped objects manufactured using the process of the invention are semipermeable flat, tubular, or hollow-fiber membranes with porous structure.

In the embodiment of the first process of the invention, in which the additive is added to the solution containing the synthetic polymer component, the additive is preferably added in a ratio of 0.1 to 10% with respect to the weight of the solution. The additive may also be added in cross-linked form, such as in the form of BASF LUVICROSS VI or LUVICROSS VI-M.

In another emnodiment of the first process of the invention, the additive used in manufacturing the shaped object can also be added in a step following the shaping of the solution. For example, the additive may be contained in the coagulant that is transited by the shaped solution.

In another preferred embodiment of the first process of the invention, the additive in manufacturing the shaped object is added in a step following shaping of the solution. The shaped object is a hollow-fiber membrane and the solution containing the synthetic polymer component is shaped via a hollow-fiber nozzle into a hollow fiber and an interior solution containing the additive is fed via the interior bore of the hollow-fiber nozzle. In an especially preferred embodiment of the invention, the interior solution contains the additive in a concentration of 0.1 to 5% by weight.

The shaped object of the invention is manufactured according to a second process of the invention by adding, as an additive to a polymer object made from a synthetic polymer component, a copolymer made from vinylpyrrolidone and a vinylimidazole compound. The polymer object may be produced using a known manufacturing process for polymer objects, for example as a powder, such as by phase separation induced thermally or by non-solvents.

In a preferred embodiment of the second process of the invention, the polymer object is a semipermeable flat, hollow-fiber, or tubular membrane with a porous structure, such as is produced by a process with diffusive or thermal phase separation.

In the second process of the invention, the additive can be added to the polymer object using any of the known application processes such as impregnation, spraying with a solution of the additive, or immersion in a solution containing the additive. In a preferred embodiment of the second process of the invention, the additive is dissolved in a bath and the polymer object drawn through the bath and dried, whereby the solution can be water and/or an organic solvent such as methanol, ethanol, or isopropanol. In an especially preferred embodiment of the second process of the invention, the additive is dissolved in the bath in a concentration of 0.001% to 2.0% by weight. A bath having a concentration of 0.01% to 1.0% by weight is highly preferred.

The copolymer of the invention used as the additive may have any known copolymer structure, such as for example, a block copolymer. Preferably the copolymer is a statistic copolymer.

In accordance with the invention, the molar ratio of the vinylimidazole compound to the vinylpyrrolidone in the copolymer may be selected from a broad range. Preferably, the ratio is from 10:90 to 90:10 mol/mol. A ratio of about 50:50 mol/mol is especially preferred.

In accordance with the invention, the vinylimidazole compound may be substituted at one or more of carbon atoms 2, 4, and 5, whereby the vinylimidazole compound is preferably 1-vinylimidazole substituted at carbon atoms 2 and/or 4 and/or 5 with a $C_1$–$C_5$-alkyl group.

In another preferred embodiment of the invention, the vinylimidazole compound is 1-vinylimidazole.

In order for the shaped object of the invention to act hydrophilically, basically any process is suitable that renders the geometric surface, and the porous surface in the case of a porous shaped object, hydrophilic. The hydrophilic action can be attained by treating the shaped object under pressure with known wetting agents such as ethanol, isopropyl alcohol, or a mixture of ethanol and/or isopropyl alcohol with water, or with water alone. However, the embodiments of the invention described in the following, which render the shaped object permanently hydrophilic, are preferred.

In one of these preferred embodiments, the synthetic polymer component is a hydrophilic polymer. The polymer may also be one that was originally hydrophobic and was chemically hydrophilized by, for example, amidation, amination, carboxylation, sulfonation, or hydroxylation. Especially preferred hydrophilic polymers are polyamide 6, polyamide 6,6, polyamide 4,6, polyethylvinyl alcohol, or sulfonated polyethersulfone.

In another of these preferred embodiments, the synthetic polymer component is a mixture of a hydrophobic polymer with a hydrophilic modification of this polymer. In another of these preferred embodiments of the invention, the synthetic polymer component is a hydrophobic first polymer and a hydrophilic second polymer. In an especially preferred embodiment of the invention, the hydrophobic first polymer is selected from the group comprising polysulfones, polyethersulfones, polyarylethersulfones, polyacrylonitriles, polycarbonates, or polyolefins such as polyethylene or polypropylene. In another especially preferred embodiment of the invention, the hydrophilic second polymer is selected from the group comprising polyvinylpyrrolidones, polyethylene glycols, polyvinyl alcohols, or sulfonated polyethersulfones.

For many applications of the shaped object of the invention, the adsorptive adhesion of the additive on the synthetic polymer component is sufficient, so that no after-treatment is required to increase the additive adhesion for these applications.

For those applications of the shaped object of the invention in which, without after-treatment of the additive, a portion of the additive would be eluted (for example by sterilization, extraction, or another after-treatment step such as pre-flushing of the membrane or by the pyrogen-contaminated liquids used) the adhesion between the additive and the shaped object is sufficiently increased by an after-treatment, whereby the additive is preferably cross-linked. All known processes for cross-linking copolymers made from vinylpyrrolidone and a vinylimidazole compound may be used, for example high-energy irradiation such as γ or UV radiation, with or without UV initiator, or thermal processes with a peroxide initiator.

In the first process of the invention, the additive is preferably added to the coagulant together with a thermal or UV initiator. In the production of hollow-fiber membranes, the additive is preferably added to the interior solution together with a thermal or UV initiator and thermally or photochemically cross-linked in a process step following coagulation, such as during drying.

In the second process of the invention, the additive is preferably pre-placed in a bath together with a UV initiator, and the polymer object is drawn through the bath and after leaving the bath subjected to irradiation with a UV lamp and dried. The shaped object may be pre-dried after leaving the bath and before irradiation.

While the additives commonly used in the art for improving pyrogen retention have always produced a shaped object that is charge-bearing, the additive of the invention results in shaped objects that bear no charge. It must be regarded as surprising that the shaped objects of the invention or those manufactured using the processes of the invention exhibit a significantly improved pyrogen retention compared to shaped objects without this additive, so that, in this manner, liquids originally contaminated with pyrogens have a pyrogen concentration, after treatment with the shaped objects of the invention, that is below the detection limit of conventionally employed test methods.

It is also surprising that the shaped objects of the invention or those produced using the processes of the invention with the vinylpyrrolidone/vinylimidazole copolymer as an additive, which bears no charge, even have significantly higher pyrogen retention than prior-art shaped objects that bear a charge, such as shaped objects with the charge-bearing copolymer made from vinylpyrrolidone and methylvinylimidazolinium methyl sulfate. For this reason, the shaped objects of the invention for retaining pyrogens and in particular endotoxins can be used with particular advantage.

As previously noted and well known, pyrogens include endotoxins. In the following examples, the pyrogen retention capacity is determined based on the example of the endotoxin retention capacity, whereby hollow-fiber and flat membranes are tested. To this end, endotoxin-containing test solutions are filtered through the membranes to be tested, under defined conditions described in more detail in the following, and the endotoxin concentrations in the filtrates are measured in comparison to those in the test solution. On the filtrate side, sterile, pyrogen-free materials are used exclusively. The depyrogenation/sterilization of the stainless-steel filtration equipment and the glass sample vessels is performed by heating for at least 3 hours to 180° C. The endotoxin concentration in the filtrates and test solutions is determined using the gel clot LAL test (Pyrogent, Bio Whittaker), which is conducted according to the working instructions of the manufacturer, but with half the volumes (50 μL) of sample, or diluted sample, and LAL reagent, whereby the endotoxin concentration is given in endotoxin units per ml and abbreviated in the following as EU/ml. The detection limit of the test kit is 0.06 EU/ml. Until measurement, the samples are stored in depyrogenated boron silicate tubes at 4–8° C. for 48 hours at most. Samples stored longer are stored below –20° C.

To determine the endotoxin retention capacity of hollow-fiber membranes, 50 capillaries of each of the membranes to be tested are integrated into test modules with a free membrane length of approximately 14 cm, so that an effective (interior) membrane surface of approximately 45 $cm^2$ results. The test solution has an endotoxin concentration of lipopolysaccharide prepared from *E. coli* 055:B5 (List) in the range of 60–240 EU/ml in isotonic NaCl solution (B. Braun Melsungen) with addition of 1.5 mM $CaCl_2$ and 0.75 mM $MgCl_2$ (in part also in isotonic NaCl solution without CaCl$_2$ and MgCl$_2$). The test solution is filtered in dead-end mode with a hose pump from the intracapillary side to the extracapillary side, whereby the filtration rate is adjusted such that the pressure build-up calculated with the transmembranal flow measured for the respective membrane is on the order of 300 mbar during filtration. The filtration took place for 180 minutes, with sampling after 30, 60, 120, and 180 minutes. The endotoxin retention capacity is determined by comparing the endotoxin concentration in the test solution with that in the permeate.

To determine the endotoxin retention capacity of flat membranes, membrane discs with 47 mm diameter are punched out and integrated into depyrogenated stainless-steel filtration equipment (Sartorius; effective membrane surface 13 cm$^2$). Test solutions with endotoxin concentrations of lipopolysaccharide prepared from *E. coli* 055:B5 (List) between 0.3 and 600 EU/ml are prepared with water (aqua ad iniect., Braun Melsungen) or with isotonic NaCl solution (Braun Melsungen) and placed in a 5 liter stainless steel container, whose outlet is connected via a PVC tube to the inlet of the filter holder. By applying 1.6 to 2 bar to the pressure reservoir, approx. 100 ml solution is filtered in each case through the membrane within 9 to 12 seconds and the filtrate collected in depyrogenated measurement cylinders. If endotoxin solutions of different concentrations are used during one experiment, they are filtered through the same filter starting with the lowest endotoxin concentration. The endotoxin retention capacity is determined by comparing the endotoxin concentration in the test solution with that in the filtrate.

The transmembranal flow TMF was measured as:

$$TMF = \Delta V/(\Delta t \cdot A \cdot p) \, [ml/min \cdot cm^2 \cdot bar]$$

with distilled water at room temperature.

The measurement of the ultrafiltration rate and sieve coefficient is performed using the methods described in EP-A 96 915 007, incorporated herein by reference. The measurement of the maximum pore size is performed using the blow-point method described in EP-B 0 361 085, incorporated herein by reference. The invention will be described in more detail in the following examples, whereby the filtrations and endotoxin determinations are conducted using the previously described methods unless otherwise stated.

EXAMPLE 1

Additive in the Membrane Formulation for a Hollow-Fiber Ultrafiltration Membrane The vinylpyrrolidone/vinylimidazole copolymer additive (BASF LUVITEC VPI 55 K18P), then polyvinylpyrrolidone (ISP PVP K30), and finally polyethersulfone (BASF ULTRASON 6020) were stirred portionwise into a 60° C. solvent mixture of 42.5 parts caprolactam, 42.5 parts butyrolactone, and 5 parts glycerol until a homogeneous mixture resulted. To form a solution, the temperature of the mixture was increased to 100° C. and the mixture stirred intensively for 8 hours. The resulting solution consisting of 19.00% by weight polyethersulfone, 13.67% by weight polyvinylpyrrolidone, 0.38% by weight vinylpyrrolidone/vinylimidazole copolymer in 100% solid form, 3.35% by weight glycerol, 31.80% by weight caprolactam, and 31.80% by weight butyrolactone was cooled to approx. 60° C. and degassed. The 60° C. solution was formed into a capillary using a hollow-fiber nozzle with a bore of 400 μm and a nozzle pin with a 170 μm bore (wall thickness approximately 60 μm) at a nozzle temperature of 62° C. at a spinning rate of 80 m/min, whereby an interior filling of 41 parts caprolactam, 41 parts glycerol, and 18 parts water was used to form the lumen. The capillary was guided through a climatic channel into the 65° C. precipitation bath consisting of demineralized water. The capillary membrane was prewashed with water at approx. 70° C. The pore-forming agents were removed with water at approx. 80° C. and the capillary membrane dried with hot air at approx. 80° C. The resulting hollow-fiber membrane had a lumen of approx. 200 μm and a wall thickness of 30 μm. The asymmetrical membrane with interior separation layer had a transmembranal flow measured with water from inside to outside of approx. 0.37 ml/(cm$^2$·min·bar), an ultrafiltration rate (UFR) for aqueous albumin solution of 42 ml/(m$^2$·h·mm Hg), a sieve coefficient for albumin of 0.03, and a sieve coefficient for cytochrome C of 0.77.

In the endotoxin retention test, the hollow-fiber membrane just described exhibited <0.06, 0.06, 0.24, and 0.24 EU/ml in the permeate with an endotoxin concentration applied to the lumen of 60 EU/ml (lipopolysaccharide prepared from *E. coli* 055:B5 in isotonic NaCl solution with addition of 1.5 mM CaCl$_2$ and 0.75 mM MgCl$_2$) after 30, 60, 120, and 180 minutes, while a hollow-fiber membrane manufactured without the additive but otherwise in a similar manner showed practically no endotoxin retention under similar testing conditions.

EXAMPLE 2

Additive in the Membrane Formulation for a Microporous Flat Membrane

In a heatable boiler, a 17% by weight polyethersulfone solution was prepared as described in Example 1, whereby 5,100 g polyethersulfone (BASF Ultrason 6020), 3,672 g polyvinylpyrrolidone (ISP PVP K30), 1,061.4 glycerol, 10,083.3 g caprolactam, 10083.3 butyrolactone, and 255 g vinylpyrrolidone/vinylimidazole copolymer additive (BASF LUVITEC VPI 55 K18P) as a 100% solid powder were weighted. The solution tempered to 50° C. was applied with a casting box to a casting roller tempered to 45° C. and moving at a rate of 2 m/min, and guided though a climatic zone into a precipitation bath of demineralized water tempered to 45° C. The membrane pre-fixed in this manner was drawn off the casting roller, extracted in a washing bath with water at approx. 80° C., and dried using a drum dryer. The resulting flat membrane had a maximum pore size of 0.50 μm and a transmembranal flow of approximately 14.5 ml/(cm$^2$·min·bar).

The endotoxin retention test was conducted by filtration using a hose pump through 3 cm$^2$ of membrane surface in polycarbonate filter holders with a filtration rate of 0.07 ml·min$^{-1}$·cm$^{-2}$ using lipopolysaccharide prepared from *Ps. aeruginosa* as the test endotoxin in isotonic NaCl solution. In the endotoxin retention test, this flat membrane exhibited 0.12 EU/ml in the filtrate, at an applied concentration of 10 EU/ml, while a membrane manufactured without the additive but otherwise in a similar manner, and with a TMF of approx. 42 m/(cm$^2$·min·bar), showed an endotoxin concentration in the filtrate of 6 EU/ml at the same applied endotoxin concentration of 10 EU/ml, i.e., practically no endotoxin retention.

EXAMPLE 3

Additive in the Interior Filling When Manufacturing a Hollow-Fiber Ultrafiltration Membrane As in Example 1 but without the vinylpyrrolidone/vinylimidazole copolymer additive, a spinning solution was prepared from 19.00% by weight polyethersulfone (BASF ULTRASON 6020), 13.67% by weight polyvinylpyrrolidone (ISP PVP K30), 3.37% by weight glycerol, 31.98% by weight caprolactam, and 31.98% by weight butyrolactone. Shaping into a capillary membrane took place as in Example 1, but with the difference that the vinylpyrrolidone/vinylimidazole copolymer additive (BASF LUVITEC VPI 55 K72W, 30% by weight solution in water) was added to the interior filling, whereby the additive concentration of the interior filling was approx. 2% by weight referred to the water content of the interior filling and 0.36% by weight referred to the overall interior filling. The precipitation bath temperature was 74° C. The resulting hollow-fiber membrane had a lumen of 215 $\mu$m and a wall thickness of 40 $\mu$m. The asymmetrical membrane with interior separation layer had a transmembranal flow of approx. 0.39 ml/(cm$^2$·min·bar), a UFR for albumin of 55 ml/(m$^2$·h·mm Hg), a sieve coefficient for albumin of 0.12, and a sieve coefficient for cytochrome C of 0.88.

In the endotoxin retention test, the hollow-fiber membrane just described exhibited <0.06, <0.06, <0.06, and <0.06 EU/ml in the permeate with a prescribed endotoxin concentration in the lumen of 60 EU/ml (lipopolysaccharide prepared from *E. coli* 055:B5 in isotonic NaCl solution with addition of 1.5 mM CaCl$_2$ and 0.75 mM MgCl$_2$) after 30, 60, 120, and 180 minutes, i.e., even after 180 minutes values below the detection limit of the LAL test, while a hollow-fiber membrane manufactured without the additive but otherwise in a similar manner showed practically no endotoxin retention under similar testing conditions.

EXAMPLE 4

Application of the Additive to a Previously Manufactured Flat Microfiltration Membrane.

A polyethersulfone flat micro filtration membrane with a transmembranal flow of 45 ml/(cm$^2$·min·bar) and a maximum pore size measured with the blow-point method of 0.50 $\mu$m was guided at a rate of 2 m/min over a roller through an immersion vat containing an aqueous solution of the vinylpyrrolidone/vinylimidazole copolymer additive (BASF Luvitec VPI 55 K72W, 30% aqueous solution) with 0.1% by weight of solid additive substance, and subsequently dried over 7 rollers.

To test the endotoxin retention, endotoxin solutions in water with concentrations of 0.3 EU/ml, 3 EU/ml, 12 EU/ml, and 240 EU/ml were filtered through the membrane in turn, whereby Table 1 shows the endotoxin concentrations in the filtrate for the same membrane with and without additive.

TABLE 1

Endotoxin retention capacity of a flat membrane with and without additive

| Applied endotoxin concentration (EU/ml) | Endotoxin concentration in membrane filtrate without additive (EU/ml) | Endotoxin concentration in membrane filtrate with additive (EU/ml) |
|---|---|---|
| 0.3 | <0.06 | <0.06 |
| 3 | 0.6 | <0.06 |
| 12 | 12 | <0.06 |
| 240 | 120 | 0.06 |

While the membrane without additive, at an applied endotoxin concentration of as low as 3 EU/mi, passes endotoxins in a concentration of 0.6 EU/ml, even at an applied concentration of 12 EU/ml, the membrane containing the additive exhibits an endotoxin concentration of <0.06 EU/ml in the filtrate, a value that is below the detection limit of the initially cited gel clot LAL test. Only with an applied endotoxin concentration of 240 EU/ml does the membrane containing the additive pass 0.06 EU/ml. At this applied endotoxin concentration, however, the membrane without additive passes 2000 times this amount of endotoxins.

The additive application has almost no effect on the transport data and maximum pore size. For a membrane with a low level of residual extract, or for long periods of use, the additive must be re-cross-linked on the membrane.

EXAMPLE 5

Application of the Additive to a Previously Manufactured Flat Microfiltration Membrane and Cross-Linking of the Additive The same microfiltration membrane as in Example 4 was saturated with an aqueous solution containing 0.2% by weight of the vinylpyrrolidone/vinylimidazole copolymer additive (BASF LUVITEC VPI 55 K72W, 30% aqueous solution), and, with respect to the additive, containing 3% by weight of the UV initiator 4,4'-diazidostilbene-2,2'-disulfonic acid disodium salt·4 H$_2$O. The membrane was then laid on a filter paper and the adhering solvent residue blotted off. Subsequently, approximately 50% of the water solvent was allowed to evaporate in air and the still-moist membrane irradiated for about 12 seconds with a DYNACHEM SC 24 UV irradiation unit at a power level of 10 kW and a wavelength of approx. 300 to 400 nm, whereby the membrane surface assumed a light beige color. Finally, the membrane was extracted, as specified in the Japanese standard test, for 1 hour in water at 70° C. and dried at 90° C.

To test the endotoxin retention, different endotoxin concentrations in water were applied to the membrane, whereby Table 2 shows the endotoxin concentrations in the filtrate for the same membrane with and without additive.

TABLE 2

Endotoxin retention capacity of a flat membrane without additive and with cross-linked additive

| Applied endotoxin concentration (EU/ml) | Endotoxin concentration in membrane filtrate without additive (EU/ml) | Endotoxin concentration in membrane filtrate with cross-linked additive (EU/ml) |
|---|---|---|
| 0.3 | <0.06 | |
| 3 | 0.6 | |
| 12 | | <0.06* |
| 24 | 12 | |
| 48 | | <0.06** |
| 120 | | <0.06* |
| 240 | 120 | |
| 480 | | 2x < 0.06/1x 0.06 |

*Measured twice;
**Measured three times;

As can be seen from Table 2, the membrane containing the cross-linked additive, even at an applied endotoxin concentration of 480 EU/ml, exhibits an endotoxin concentration of <0.06 EU/ml or 0.06 EU/ml in the filtrate, a value that is below or at the detection limit of the initially cited gel clot LAL test, while the membrane without the additive, at an applied endotoxin concentration of as low as 3 EU/ml, passes endotoxins at measurable levels.

In endotoxin solutions prepared with isotonic NaCl solution, the membrane containing the cross-linked additive exhibited a value of <0.06 EU/ml in the filtrate at an applied endoxotin concentration of 6 EU/ml. Only at an applied endotoxin concentration of 48–60 EU/ml does the membrane containing the cross-linked additive start to pass endotoxins. However, at an applied endotoxin concentration of 480–600 EU/ml, the endotoxin concentration in the filtrate is only between 0.6 and 1.2 EU/ml.

EXAMPLE 6

Application of a Vinylpyrrolidone/vinylimidazole Copolymer Additive to a Previously Manufactured Flat Microfiltration Membrane The membrane produced as in Example 4 was saturated with a solution containing 0.2% by weight vinylpyrrolidone/vinylimidazole copolymer additive (BASF LUVITEC VPI 55 K72W), whereby the additive contained vinylpyrrolidone and vinylimidazole in a molar ratio of 50:50 mol/mol. The excess was allowed to drip off and the membrane dried for 30 minutes at 90° C.

COMPARATIVE EXAMPLE 1

Application of a Vinylpyrrolidone/3-methyl-1-Vinylimidazolinium Methyl Sulfate Copolymer Additive to a Previously Manufactured Flat Microfiltration Membrane The membrane produced as in Example 4 was saturated with a solution containing 0.33% by weight vinylpyrrolidone/3-methyl-1-vinylimidazolinium methyl sulfate copolymer as an additive (BASF LUVITEC QUAT 73 W), whereby the additive contained vinylpyrrolidone and 3-methyl-1-vinylimidazolinium methyl sulfate in a molar ratio of 70:30 mol/mol. The excess was allowed to drip off and the membrane dried for 30 minutes at 90° C.

The results of the endotoxin retention test are shown in Table 3.

TABLE 3

Endotoxin retention test in test solutions prepared with isotonic NaCl solution

| Applied endotoxin concentration (EU/ml) | Endotoxin concentration in membrane filtrate with vinylpyrrolidone/vinylimidazole copolymer as additive (EU/ml) | Endotoxin concentration in membrane filtrate with vinylpyrrolidone/3-methyl-1-vinylimidazolinium methyl sulfate copolymer as additive (EU/ml) |
|---|---|---|
| 6 | 0.12–0.3 | 0.48–0.6 |
| 30–48 | 0.6 | 6 |
| 480 | 1.2–3 | 30 |

As can be seen from Table 3, the membrane treated with the vinylpyrrolidone/vinylimidazole copolymer additive of the invention exhibited considerably better endotoxin retention capacity than the membrane treated with the vinylpyrrolidone/3-methyl-1-vinylimidazolinium methyl sulfate additive, outside the scope of the invention, whose structure differs from the additive of the invention in the quaternization of nitrogen in position 3 with methyl sulfate, so that the additive outside the scope of the invention bears a positive charge at the nitrogen.

EXAMPLE 7

A spinning solution prepared as in Example 1, but without the vinylpyrrolidone/vinylimidazole copolymer additive, was shaped into capillaries a), b), and c) at a temperature of 60° C. using the hollow-fiber nozzle of Example 1 at a nozzle temperature of 71° C. and, as described in Example 1, guided through a climatic channel and through an aqueous precipitation bath, resulting in hollow-fiber membranes with a lumen of 200 μm and a wall thickness of 40 μm.

In manufacturing capillary a), an interior filling without additive was used to form the lumen. In manufacturing capillary b), an interior filling containing 2% by weight of the vinylpyrrolidone/vinylimidazole copolymer additive was used to form the lumen. In manufacturing capillary c), an interior filling containing 2% by weight of the vinylpyrrolidone/3-methyl-1-vinylimidazolinium methyl sulfate copolymer additive was used to form the lumen.

After washing and drying, transmembranal flow values of 0.14 ml/min·cm$^2$·bar for capillary a), 0.15 ml/min·cm$^2$·bar for capillary b), and 0.11 ml/min·cm$^2$·bar for capillary c) were measured.

In the endotoxin retention test, the capillaries b) treated with the vinylpyrrolidone/vinylimidazole copolymer additive of the invention exhibited, in modules with 45 cm$^2$ free membrane surface and a filtration rate of 0.04 ml·min$^{-1}$·cm$^2$, <0.06 EU/ml in the filtrate with an applied endotoxin concentration of 240 EU/ml (lipopolysaccharide prepared from Ps. aeruginosa in isotonic NaCl solution with addition of 1.5 mM CaCl$_2$ and 0.75 mM MgCl$_2$) after 60 minutes, i.e., a value below the detection limit of the gel clot LAL test.

In the endotoxin retention test, the capillaries c) treated with the vinylpyrrolidone/3-methyl-1-vinylimidazolinium methyl sulfate copolymer additive, outside the scope of the invention, exhibited, in modules with 5 cm$^2$ free membrane surface and a filtration rate of 0.03 ml·min$^{-1}$·cm$^{-2}$, <0.48 EU/ml in the filtrate with an applied endotoxin concentration 240 EU/ml (lipopolysaccharides prepared from Ps. aeruginosa in isotonic NaCl solution with addition of 1.5 mM CaCl$_2$ and 0.75 mM MgCl$_2$) after 60 minutes, i.e, a value clearly above the detection limit of the gel clot LAL test.

The capillaries a) without additive, tested under the same conditions as capillaries c), also exhibited an endotoxin concentration in the filtrate of 0.48 EU/ml after 60 minutes.

What is claimed is:

1. A hydrophilically acting porous membrane for pyrogen retention, comprising:
    a synthetic polymer component and an additive, wherein the additive is a copolymer made from vinylpyrrolidone and a vinylimidazole.

2. The hydrophilically acting shaped object according to claim 1 having a porous structure.

3. The hydrophilically acting porous membrane according to claim 1, wherein the porous membrane is a flat, tubular or hollow-fiber membrane.

4. The hydrophilically acting porous membrane according to claim 1, wherein the copolymer is a statistic copolymer.

5. The hydrophilically acting porous membrane according to claim 1, wherein the copolymer additive contains the vinylimidazole compound and vinylpyrrolidone in a molar ratio of from between 10 moles vinylimidazole compound to 90 moles vinylpyrrolidone and 90 moles vinylimidazole compound to 10 moles vinylpyrrolidone.

6. The hydrophilically acting porous membrane according to claim 5, wherein the molar ratio is about 50 moles vinylimidazole compound to about 50 moles vinylpyrrolidone.

7. The hydrophilically acting porous membrane according to claim 1, wherein the vinylimidazole compound is 1-vinylimidazole substituted at carbon atoms 2, 4, 5, and combinations thereof with a $C_1$–$C_5$-alkyl group.

8. The hydrophilically acting porous membrane according to claim 1, wherein the vinylimidazole compound is 1-vinylimidazole.

9. The hydrophilically acting porous membrane according to claim 1, wherein the additive is cross-linked.

10. The hydrophilically acting porous membrane according to claim 1, wherein the synthetic polymer component is a hydrophilic polymer.

11. The hydrophilically acting porous membrane according to claim 10, wherein the hydrophilic polymer is polyamide 6, polyamide 6,6, polyamide 4,6, polyethylvinyl alcohol or sulfonated polyethersulfone.

12. The hydrophilically acting porous membrane according to claim 1, wherein the synthetic polymer component is a mixture of a hydrophobic polymer and a hydrophilic modification of the hydrophobic polymer.

13. The hydrophilically acting porous membrane according to claim 1, wherein the synthetic polymer component comprises a hydrophobic first polymer arid a hydrophilic second polymer.

14. The hydrophilically acting porous membrane according to claim 13, wherein die hydrophobic first polymer is selected from the group consisting of polysulfones, polyethersulfones, polyarylethersulfones, polyacrylonitriles, polycarbonates, and polyolefins.

15. The hydrophilically acting porous membrane according to claim 13, wherein the hydrophilic second polymer is selected from the group consisting of polyvinylpyrrolidones, polyethylene glycols, polyvinyl alcohols, and sulfonated polyethersulfones.

* * * * *

UNITED STATES PATENT AND TRADEMARK OFFICE
CERTIFICATE OF CORRECTION

PATENT NO. : 6,632,361 B2
DATED : October 14, 2003
INVENTOR(S) : Thorsten Niklas et al.

Page 1 of 1

It is certified that error appears in the above-identified patent and that said Letters Patent is hereby corrected as shown below:

Column 4,
Line 23, "emnodiment" should be -- embodiment --.

Column 9,
Line 64, "mi" should be -- ml --.

Column 12,
Lines 45 and 46, claim 2 should be omitted. This claim was cancelled.

Signed and Sealed this

Twenty-second Day of March, 2005

JON W. DUDAS
*Director of the United States Patent and Trademark Office*